(12) United States Patent
Moss et al.

(10) Patent No.: US 7,421,372 B1
(45) Date of Patent: Sep. 2, 2008

(54) MAINTENANCE SCHEDULING METHOD

(76) Inventors: Robert D. Moss, 1110 Market St., Suite 525, Chattanooga, TN (US) 37402; John Reeve, 1110 Market St., Suite 525, Chattanooga, TN (US) 37402; Michael L. Brown, 1110 Market St., Suite 525, Chattanooga, TN (US) 37402

( * ) Notice: Subject to any disclaimer, the term of this patent is extended or adjusted under 35 U.S.C. 154(b) by 84 days.

(21) Appl. No.: 11/486,624

(22) Filed: Jul. 14, 2006

Related U.S. Application Data

(60) Provisional application No. 60/699,544, filed on Jul. 15, 2005.

(51) Int. Cl.
 *G06F 17/60* (2006.01)
(52) U.S. Cl. ..................................................... 702/184
(58) Field of Classification Search ................. 702/184, 702/183
See application file for complete search history.

(56) References Cited

U.S. PATENT DOCUMENTS

| | | | |
|---|---|---|---|
| 2002/0174000 A1* | 11/2002 | Katz et al. | 705/7 |
| 2003/0171970 A1* | 9/2003 | Kinsella | 705/9 |

* cited by examiner

*Primary Examiner*—Tung S Lau
(74) *Attorney, Agent, or Firm*—Stephen J. Stark; Miller & Martin PLLC

(57) ABSTRACT

A work scheduling method utilizes a Computerized Maintenance Management System (CMMS) which communicates with a work order database and a labor pool database, each having a plurality of entries therein. A resource leveling program accesses the entries in the databases and applies an order of fire to the entries to utilize available manpower in a manner which at least attempts to achieve plant success through the provision of at least a draft work schedule. After running the resource level program, the preferred embodiment allows user input to affect at least portions of the order of fire to allow modification and an ability to rerun the program.

17 Claims, 2 Drawing Sheets

MAINTENANCE SCHEDULING METHOD

CLAIM OF PRIORITY

This application claims the benefit of U.S. Provisional Patent Application No. 60/699,544 filed Jul. 15, 2005.

FIELD OF THE INVENTION

The present invention relates to an automated method for scheduling weekly maintenance work utilizing an available pool of crafts in an effort to efficiently and effectively decrease the backlog and in the preferred embodiment provides a method of accessing work orders from an existing CMMS, creating a set schedule of maintenance activities through an algorithm, storing the result set within the original software program, and also promote subsequent compliance reporting.

DESCRIPTION OF RELATED ART

There are a number of software products available on the market which are suited to plant maintenance activities. In the industry, they are often referred to as Computerized Maintenance Management Systems (CMMS). Maximo® is one such product that coordinates materials management, contract management, procurement management, asset management, work management and service management. This software program allows for the creation of work orders and provides a way to manage assets. Most CMMS products require an interface to an external scheduling tool. Unfortunately, the success in such systems depends on ease of use, and data processing speed. Additionally, these scheduling tools utilize primitive techniques for resource leveling.

Other companies provide similar products such as SAP (™), Passport, EMPAC, Datastream, and Oracle provide similar planning and maintenance management software. MS Product and Prima Vera are other scheduling tools which are utilized to perform resource leveling by other of which the applicant is aware.

Prior art maintenance management software applications (CMMS systems) are not known by the applicant to effectively generate weekly schedules. Instead, they all rely upon one or more human operators to schedule maintenance based on existing work orders and preventive maintenance schedules to manually click and select which of the available items should be performed in any particular period. In the majority of the plants the applicant has visited utilizing these programs, over a period of time the work order list increases as the management teams do not effectively and efficiently utilize their resources, materials and equipment to reduce their work orders and maintenance tasks. The absence of a weekly schedule greatly hinders the overall efficiency of the workforce.

Subjective selection, as opposed to automated selection, of work orders which is primarily utilized in the prior art. Staff based upon their experience provides the best guess as to what work should be placed on the schedule for the next week. In most subjective selection techniques, management teams offer to bring printed backlog of their particular work items to the meeting. However this list is not reviewed and each individual usually has a list of their preferred work to be performed for the week. Together the team usually makes judgment calls as to how much work can be handled in a given week. When coordinated work requiring supporting crafts to work together is involved, the opportunity for disagreement and personalities to arise becomes problematic in many instances.

One effort at utilizing the CMMS software has been to employ a method of resource allocation known as the "MRA method" to migrate data outside of the CMMS program to another software product such as M/S Project or P3. Where utilizing Maximo® together with M/S Project or P3, the user must (a) own software package M/S Project or P3, (b) understand how it works, and/or (c) have the time to manipulate data going back and forth between the two software products which are not provided to continuously communicate with one another.

It is the applicant's experience that most plants or work environments do not have a combination of these elements to perform a significant scheduling capability. They lack staff and training. One perceived disadvantage is the CMMS—Scheduling interface is limited on what detailed calendar data it can transfer. Another limitation is that the priority ranking capability is limited—as required by the resource leveling process. This is not believed to result in maximizing the efficiency of use of resources.

Accordingly, there is believed to be a need to provide a weekly maintenance scheduling method which does not rely solely on the effectiveness of one or more operators to schedule work.

SUMMARY OF THE INVENTION

Accordingly, it is a present object of the present invention to search a database for work orders [resource demand] corresponding to a maintenance backlog of maintenance tasks, examine the worker resources from a pool of crafts and apply an order of fire to schedule work tasks to prioritize and schedule work tasks in an effort to complete work tasks more efficiently and effectively.

It is another object of the present invention to provide a method of accessing work orders from CMMS product, prioritizing the work orders in accordance with a priority plan while taking into consideration the available resources to perform the work orders.

In accordance with the presently preferred embodiment of the present invention, an existing maintenance management software program such as a computer maintenance management software (CMMS) application as commercially available is utilized. Utilizing a software application such as a record writer program, work orders are accessed along with a database of the pool of available craft workers and a maintenance schedule is created utilizing an order of fire (i.e., priority order) in the CMMS database on an external table. This new table is provided within the CMMS software for use in maintaining the periodic schedule. An efficiency factor is preferably utilized since it is extremely unlikely to have any particular worker that is 100% efficient much less a pool of workers that are 100% efficient. Utilizing the efficiency factor, the pool of crafts database, the maintenance work order database and the priority order, a maintenance schedule is provided on a periodic basis such as weekly on the table and provides a particularly effective tool in allowing management to track the allocation of resources, materials and equipment for maintenance including an ability to track why particular maintenance activities were not performed in accordance with the schedule.

As the maintenance activities are performed and the completed, work orders are marked complete these status codes are excluded from future processing. At the end of the weekly schedule, an operator notes rationales as to why a particular maintenance item was not completed such as a particular work supervisor instructed for another event to be performed, etc.

Obviously, most plants are somewhat flexible. While the schedule has been automatically calculated, it is not too late to amend. It is common practice to consider "opportunistic scheduling". While reviewing the weekly schedule, management may observe common locations such that non-selected work may make sense to be forced onto the schedule. The RLP process and program allow for last minute additions. Modification of the priorities could then efficiently utilize worker resources. When complete, the scheduler distributes the weekly schedule to all affected departments. The schedule will be based on priority to the company's success-not a pet project or flavor of the month.

BRIEF DESCRIPTION OF THE DRAWINGS

The particular features and advantages of the invention as well as other objects will become apparent from the following description taken in connection with the accompanying drawings in which.

DETAILED DESCRIPTION OF THE DRAWINGS

Figure 1:
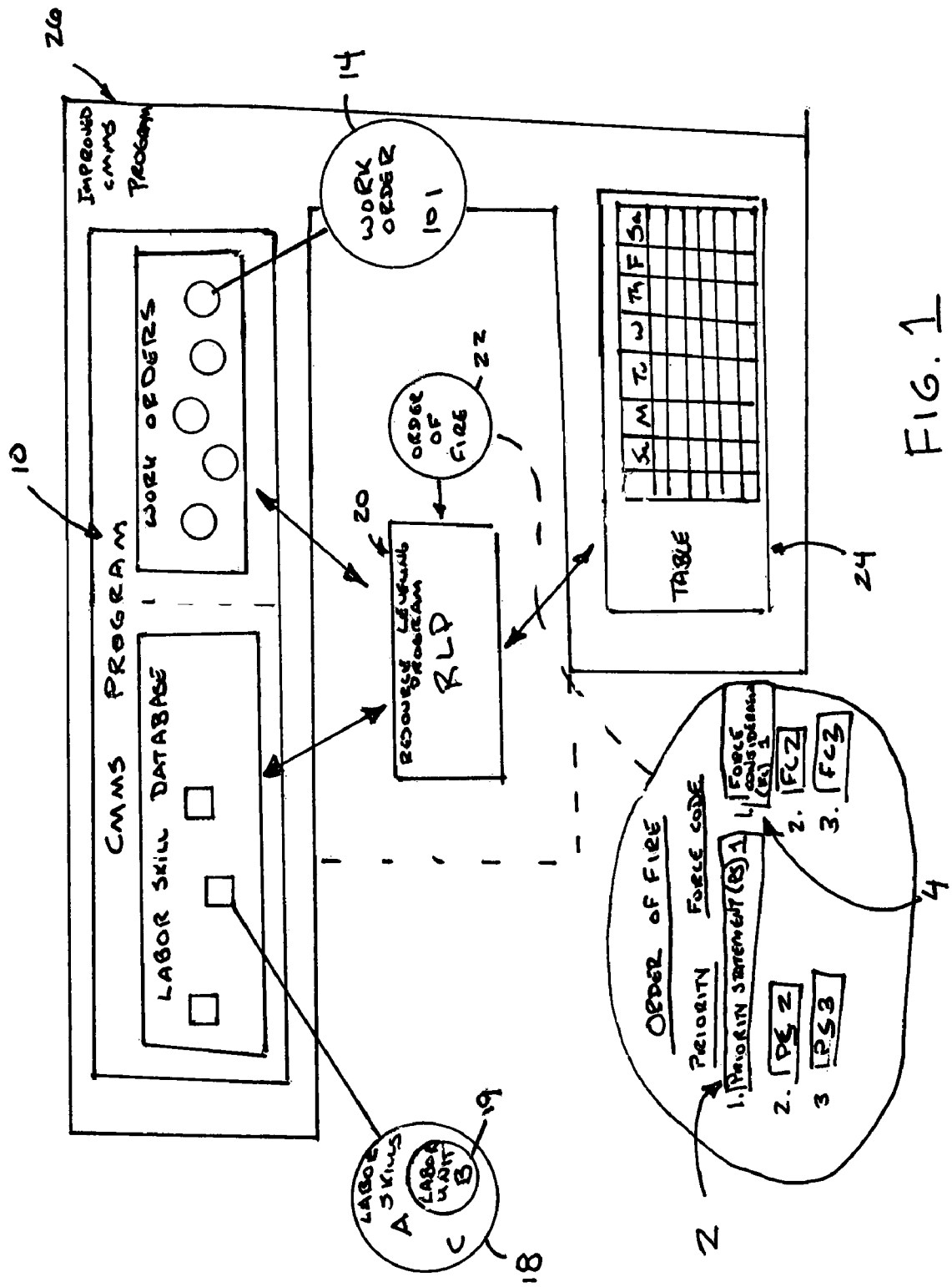
FIG. 1 is a diagrammic representation of the method of creation of a maintenance schedule within a Computerized Maintenance Management System in accordance with the presently preferred embodiment of the present invention.

Computerized Maintenance Management Systems (CMMS) programs currently available on the market often have the ability to track the status of work orders or maintenance activities. Such software is particularly helpful in industrial plants, utility companies and other settings. At least one competitor provides a SQL based CMMS program which provides an initial CMMS program 10 which provides a database of work orders 12 comprised of individual work orders such as 14 which contains such data as the maintenance to be performed and the crafts necessary to support the work, the location of the work, the conditions of the industrial plant for the work to be performed and any number of other categories which can be customized by the user of the software. The work order items 14 typically include the date of entry of the work order, the work order number, the work type, the status, the schedule date, the calculated priority, the reason code, tools required, description of work, and general cost to perform the work. Other items could also be provided. This additional information could also be disclosed in the schedule produced by the table 24 as will be described below.

Another feature of the initial CMMS software 10 is the ability to provide a database 16 of the labor skills and personnel available to perform maintenance at the disposal of the maintenance management team. In an industrial setting such skills could include boiler techs, mechanics, electricians, etc. Additionally, within a particular skill set such as mechanics, there may be some employees which are capable of performing certain tasks while others lack the expertise, training and/or experience to perform such work either due to the complexity of the work and/or the incompetence or inability of the particular employee.

While the applicant is unaware of prior art labor pool databases 16 which check the skills of individual workers, the database 16 can be modified to provide additional data for each entry which could include such information. Other information such as shifts, vacation dates, etc. can also be coupled to individual entries in the database 16. It is important to remember that the applicant is unaware of any such modification of the labor pool database 16 in the art.

In the prior art software program, a graphic interface allowed users of the CMMS program 10 to match individual people with work orders to create a schedule. While relying on the skill set of an individual to perform such an operation may be relatively easy with a limited number of work orders, many industrial settings have hundreds if not thousands of open work orders which would make this task extremely difficult. Furthermore, coordinating among multiple groups of skill sets such as electricians and mechanics is often difficult when different people are responsible for a particular skill set such as the head mechanic or the head electrician and those individuals may or may not have different priorities for the utilization of their people.

The applicant discovered that due to inefficiencies in the prior art system attempting to match particular individuals with particular work orders relying on the skill of the operator assigning the work that a need existed for an improved method of creating a work schedule. Accordingly, the applicant provided a resource leveling program 20 which in the presently preferred application is a separate software program from the CMMS 10 but could be integrated within it by CMMS program owners. The applicant relied upon a report writing program known as an ACTUATE(™) to provide the programming necessary to run the resource leveling program 20. But the programming language could be other such languages as Java or other language.

The resource level program 20 accesses the work order database 12 for the various work orders 14 along with the labor skill database 16 of the various labor skills 18 and in some embodiments can even analyze the individual labor components 19 (i.e., work men or women, even possibly including what days or even what shifts, etc., they are available, such as to account for planned absences such as vacation, etc.) and utilizing an order of fire 22 (i.e., priority instructions) produces a schedule which is located within CMMS program 10 after the creation of a new table 24. Since the CMMS program 10 is SQL based, the various items in the table 24 are preferably linked together with the work orders 14 in the work order database 12 so that a change in any particular one item when linked to another item will result in a change in the linked item as well as the changed item. Accordingly, while the table 24 is a new arrangement of data from the CMMS program 10 all the data within the table 24 in the preferred embodiment resided in the original CMMS program 10. This has a number of advantages.

Principally, any change in any data element whether in the work order database 14 or in the table 24 is a universal change meaning that regardless of where the work order is marked completed, it universally shows up as completed and is not rescheduled. Furthermore, there is no need to import and export data from the improved CMMS program 26. If a work order 18 is not completed in a particular schedule, then it may not necessarily be automatically rescheduled, but it is likely that if the same criteria for an order of fire 22 are provided, then it could appear in the next period's schedule in table 24. There is no automatic overwrite of dates as is believed to occur using MS Project together with existing CMMS programs 26. This allows for the preservation of historical data (which is lost with current systems) which can be useful to management.

Figure 2:
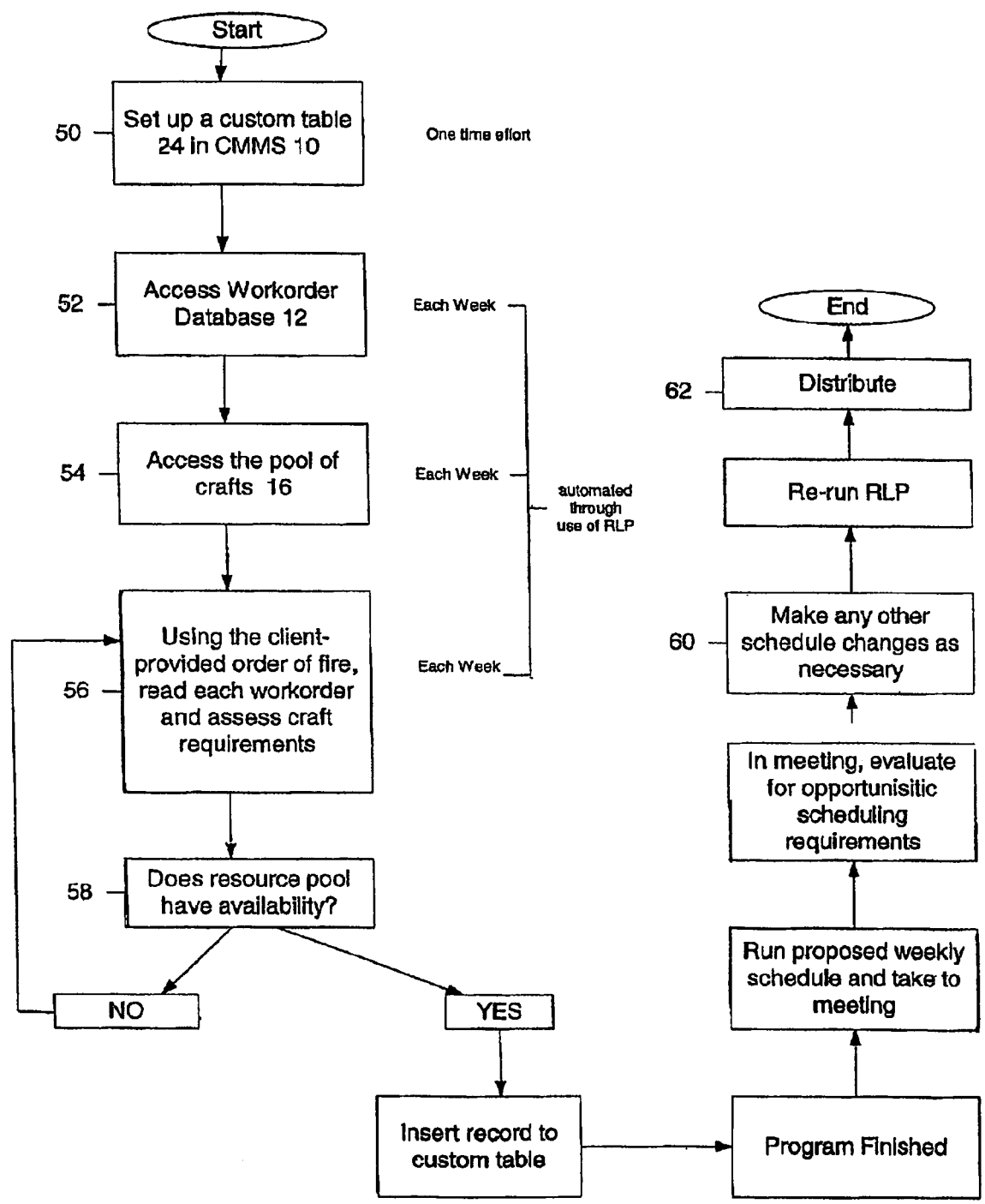
FIG. 2 is a flow chart showing the presently preferred embodiment of the present invention.

Referring to FIG. 2, the first step of the presently preferred embodiment of the present invention is to set up or install a custom table in the improved CMMS program 26. Custom table 24 in the Improved CMMS program 26 as shown in step 50. the table 24 preferably includes some predetermined database arrangement (rows and columns having pre-identified locations, however others may be assignable by the particular application and use). At least some information is preferably linked by SQL codes to the work order database 12 from locations in the table 24.

At step 52 the work order database 12 is accessed by the resource leveling program 20. At step 54, a pool of crafts database 16 is accessed. The resource leveling program 20 utilizes the work order database 12 with the pool of crafts database 16 at step 56 by implementing an order of fire 22 to prioritize the work orders 14 in the work order database 12 to create a schedule of maintenance events to be performed which is placed in table 24 for a particular week or other time period.

The order of fire 22 may be prioritized by performing emergency maintenance (EM Codes) first, then performing in progress work, corrective maintenance second, performing capital job scheduled with outside labor previously scheduled third, performing corrective maintenance not in progress, then performing preventive maintenance. Other orders of fire can be utilized and even adjusted by the user. The order of fire 22 is preferably utilized in conjunction with an efficiency factor, the work order database 12 and the craft pool 16 by the resource leveling program 20 to provide a schedule in the table 24. Once a particular craft pool 18 is exhausted, then it is important to remember that no further use of such craft pool 18 can be utilized in a particular scheduling period. Accordingly, any other maintenance which may have otherwise may be performed may be skipped so that other craft pools are similarly exhausted to maximize the efficiency of available workers.

When creating the table 24 it is likely that a line of the table could include a yes or no for scheduled tasks for current schedule or could be a date scheduling item or could be scheduled by date or other notification. Accordingly, when printing at least a portion of the table 24 it may be possible to print the current schedule as opposed to all work orders in the database 12. It is important to remember that the pool of craft database 16 is not infinite, at some point it will likely run out during the creation of the schedule in the table 24.

Once a schedule from the table 24 is printed, it can then be taken to the weekly work scheduling conference. Before it is taken the operator could look to see if any jobs are performed at remote locations or any jobs on the proposed schedule suggest an efficiency or work such as performing multiple jobs at a remote worksite so that to maximize the efficiency of the workers better such as at step 58. If so, the operator utilizing the resource leveling program can adjust the order of fire program or make manual adjustment to display those other open work orders 14 at that remote location or other efficiency type objective. These are reflected by steps 58 and 60.

Furthermore, any other type of efficiency adjustment can occur in step 60 to the proposed schedule a number of times. The schedule can then be printed at step 62. As work orders are completed, the CMMS system 26 and the work order database 12 is updated as reflected by step 64. This prevents completed work orders from being rescheduled with the scheduling procedures. By integrating the work schedule into the Improved CMMS program 26 as an integral part of it, inefficiencies of sending data back and forth between programs or having to update multiple programs are eliminated.

While this preferred embodiment uses the Maximo® program, SAP PM, Datastream MP2, Passport, EMPAC, Insight, Ivara, and others are believed to be similar CMMS systems which could utilize the method described and taught herein.

The resource leveling program 20 preferably utilized an efficiency factor whether for an efficiency factor for all work performed such as 70% or 80% efficient or even for particular workers. Such information, if known, can be placed in the craft pool database 16 and/or maintained by the resource leveling program 20. Accordingly, if 400 man hours are available, and an efficiency factor of 70% is utilized, 280 hours of availability are schedulable. Of course, slightly more than 280 hours of maintenance may be scheduled to attempt to increase additional performance from the employees. Furthermore, reactive maintenance may fill up the remaining percentage of time not explicitly scheduled depending upon the age and wear and tear occurring at a particular maintenance location.

It is important to remember that ideally every maintenance event is planned through work orders. This allows for the tracking of all work performed by the members of the craft pool 16 to maximize the use and capabilities of the improved CMMS program 26.

It has been conceived from utilizing this method the work type such as asset priority it important to accurately provide work orders. Emergency maintenance should be provided as that type in order for it to get prioritized in accordance with the identifiers approved by the management.

In the preferred embodiment, the report writer or the resource leveling program 20 writes a schedule to the table 24 each time the program is run. The resource leveling program 20 creates a table 24 the first time it is run, and then fills in the table with a new work schedule for a particular period, such as a week. A single schedule may or may not be rerun for a particular week t overwrite a particular location for that week in the table 24. In other embodiments, multiple tables 24 may be utilized. Also, in the preferred embodiment the resource leveling program 20 may or may not allocate a particular individual entry 19 to a particular work order 14. Letting management have this flexibility may allow them to remain in control of their departments. However, in other embodiments, especially with new work supervisors, this may be a desirable option.

The schedule produced by the table 24 is will yield a drastic improvement in efficiency as a result and better tracking of maintenance activity will occur. Furthermore, although the initial time estimates may not be completely accurate as to the time of work order completion, this information can be garnered through the use of the schedule provided by the table 24 so that tracking an accurate estimation can be performed in the future.

In one instance utilizing a CMMS, the applicant discovered that at one plant each of the individual workers 19 were actually conducting maintenance 26% of the time. Poor planning, wrong locations, and having the wrong tools resulted in poor efficiency. By proper scheduling of the activities utilizing table 24, efficiency was drastically improved using the applicant's method. A decrease in the backlog of work orders in the work order database 12 has been experienced.

It is important to remember that data does not migrate from the Improved CMMS program 26 but retains internal thereto with links joined by the SQL code from table 24 to the work order database 12 and possibly the labor pool database 16 and even an equipment database if utilized in alternative embodiments. With just a few clicks, an operator can quickly generate a schedule to efficiently utilize resources available. This is believed to be a drastic improvement over the prior art alternatives.

The RLP 20 preferably creates the work schedule 24 as a portion of an embedded table which is created internal to the CMMS program 10. By operating in this manner, once a schedule is established, it can be maintained as historical data. Furthermore, if a work order is not completed in a particular week, instead of it automatically showing up on the next week's schedule, an operator can utilize reason codes to track why the work order was not completed as schedule. Accordingly, if operations would not allow an asset to be tagged out for a scheduled maintenance activity. The plant manager would likely know that operations was not paying attention at the scheduling meeting.

The order of fire 22 as shown in FIG. 1 has a plurality of priority statements 2 which are basically SQL statements for sorting out which work orders 19 from the database 18 are put on the schedule 24. Furthermore, force considerations 4 are useful as well. Priority statements perform the select function, such as WORKTYPE='EM' AND STATUS IN ('WSCH', 'APPR', 'READY', 'INPRG', 'INCOMP'). Furthermore, the priority statements 2 also preferably perform the sort function such as ORDER BY REPORTDATE. The sort function allows those work orders 19 which have been selected to be sorted as long as available labor crafts are available to support the work order. Furthermore, using force considerations 4 such as FORCE THIS SQL, even if insufficient labor is available, the selected work orders can be forced on the schedule anyway. The priority statements 2 are preferably user provided and/or user modifiable which allows the user to select which of the work orders based on one or more data fields and then sort based on at least one data field from one of the labor entries 19 or work order entries 14. Each of the priority statements 2 have this capability which cannot be performed with known prior art technology.

In such situations as Emergency Maintenance, there may not be a man hour estimate for all of the labor crafts. This is one reason why force considerations 4 have been found helpful. Other possible force considerations include forcing by scheduled start date, by target start date, etc. Force considerations 4 may or may not be employed for a particular priority statement 2 (such as being left blank, etc.).

While searching by work type has been provided as an SQL statement for a priority statement 2 above, other statements such as STATUS='INPRG' AND WORKTYPE NOT IN ('BLKT', 'PM', 'PM/PDM') AND ESTABLHRS>0 ORDER BY ACTSTART could be utilized as the select and sort command. Accordingly, separate select and order statements can be provided which is not believed to be possible with prior art techniques.

The preferred embodiment performs the priority statements 2 in order (such as top to bottom or otherwise) as shown in FIG. 1. Although only three priority statements 2 are shown, there could be more in other embodiments. Once the available labor pool is exhausted, and the ordering provided, the work schedule 24 can be viewed.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed is:

1. A work scheduling method comprising:
providing a Computerized Maintenance Management System operably coupled to a work order database having a plurality of work order entries and to a labor pool database having a plurality of labor pool entries;
providing a resource leveling program which runs on at least one computer, said resource leveling program accessing the work order database and the labor pool database, and applying an order of fire to the work order entries and the labor pool entries and to at least assist in developing and storing a work schedule internal to the Computerized Maintenance Management System; and
wherein at least one of the order of fire and the labor pool entries contain an efficiency factor other than one hundred percent and the efficiency factor is applied during the step of applying the order of fire to at least assist in developing the work schedule.

2. The work scheduling method of claim 1 wherein the resource leveling program is external to the Computerized Maintenance Management System.

3. The work scheduling method of claim 1 wherein the work order entries contain at least three data items and the order of fire provides a capability of separately sorting multiple selects based on operator input to develop the work schedule.

4. The work scheduling method of claim 1 further comprising a force capability for forcing results of a particular search onto the work schedule regardless of a sufficient availability of a particular labor craft is available to support at least one work order.

5. The work scheduling method of claim 1 wherein the order of fire attempts to prioritize work order entries by selecting from the group of emergency maintenance and in progress maintenance before preventative maintenance to provide the work schedule.

6. The work scheduling method of claim 2 wherein the work schedule has links to work order entries provided therein.

7. A work scheduling method comprising:
providing a Computerized Maintenance Management System operably coupled to a work order database having a plurality of work order entries and to a labor pool database having a plurality of labor pool entries; and
providing a resource leveling program which runs on at least one computer, said resource leveling program accessing the work order database and the labor pool database, and applying an order of fire to the work order entries and the labor pool entries and storing a work schedule operably coupled to the Computerized Maintenance Management System; wherein said order of fire performs at least two select procedures which are separately sorted based on at least two different sort commands to develop the work schedule;
wherein the order of fire prioritizes the work order entries and determines whether sufficient labor pool entries having at least one particular criteria are available to perform particular work order entries as a select and outputs those work orders which have a sufficient selection of available labor pool entries to perform particular work order entries to the work schedule based on a sort and the labor pool entries are directed to specific personnel and include an entry related to whether the specific personnel is qualified to perform a specific work order entry.

8. The work scheduling method of claim 7 wherein the labor pool entries provide an indication related to the availability of a particular labor craft on a particular date.

9. The work scheduling method of claim 7 wherein at least one of the order of fire and the labor pool entries contain an efficiency factor less than one hundred percent and the efficiency factor is applied during the step of applying the order of fire to at least assist in developing the work schedule.

10. The work scheduling method of claim 7 wherein the labor pool entries have data related to one or more labor skill and availability.

11. The work scheduling method of claim 7 wherein the work schedule is provided weekly.

12. The work scheduling method of claim 7 wherein the work schedule is provided on a table internal to the Computerized Maintenance Management System and historical work schedules are preserved.

13. The work scheduling method of claim 7 wherein at least one of the labor pool database and the work order database are portions of the Computerized Maintenance Management System.

14. The work scheduling method of claim 7 wherein after generating the work schedule, an operator can provide input to affect the order of fire and rerun the resource leveling program to affect at least some of the work order entries provided on the work schedule.

15. The work scheduling method of claim 7 further comprising a force capability for forcing results of a particular search onto the work schedule regardless of a sufficient availability of a particular labor craft is available to support at least one work order.

16. The work scheduling method of claim 14 wherein at least some of the work order entries on the work schedule remain the same after rerunning the resource leveling program.

17. A work scheduling method comprising:

providing a Computerized Maintenance Management System operably coupled to a work order database having a plurality of work order entries and to a labor pool database having a plurality of labor pool entries;

providing a resource leveling program which runs on at least one computer, said resource leveling program accessing the work order database and the labor pool database, and applying an order of fire to the work order entries and the labor pool entries and storing a work schedule operably coupled to the Computerized Maintenance Management System; wherein said order of fire performs at least two select procedures which are separately sorted based on at least two different sort commands to develop the work schedule;

wherein the work schedule is provided on a table internal to the Computerized Maintenance Management System and historical work schedules are preserved; and wherein a user can input a reason code relative to why a work order was not completed in a particular weekly schedule.

* * * * *